United States Patent [19]

Vincent

[11] Patent Number: 4,920,684
[45] Date of Patent: May 1, 1990

[54] THROW-AWAY CASTING BAG

[76] Inventor: Ogden W. Vincent, 2166 La Miel Way, Campbell, Calif. 95008

[21] Appl. No.: 122,358

[22] Filed: Nov. 16, 1987

Related U.S. Application Data

[63] Continuation-in-part of Ser. No. 882,776, Jul. 7, 1986, abandoned.

[51] Int. Cl.$^5$ .............................................. A01K 97/04
[52] U.S. Cl. ...................................... 43/41.2; 43/42.1
[58] Field of Search .................... 43/41, 43.12, 44.99, 43/41.2, 42.1

[56] References Cited

U.S. PATENT DOCUMENTS

| | | | |
|---|---|---|---|
| 2,780,021 | 2/1957 | Fagg | 43/44.99 |
| 3,273,277 | 9/1966 | Valentine | 43/41 |
| 3,854,235 | 12/1974 | Thompson | 43/43.12 |
| 4,077,151 | 3/1978 | Johnson | 43/43.12 |

FOREIGN PATENT DOCUMENTS

| | | | |
|---|---|---|---|
| 1266093 | 5/1961 | France | 43/44.99 |
| 1342418 | 9/1963 | France | 43/41 |
| 1384826 | 11/1964 | France | 43/41.2 |
| 2275145 | 1/1976 | France | 43/43.12 |

Primary Examiner—Gene P. Crosby

[57] ABSTRACT

A bag to aid in casting a bait fish is described. The bag is a throw-away or bag that is only used once because the bag is designed to disintegrate or come apart once it is in the water. The principal example is a bag that is long and narrow, being designed to hold a bait fish. Only the top of the bag is open for insertion of the bait. The sides, front, back, and bottom of the bag are closed and are glued together at the seams by a glue which very easily dissolves in water. Near the top of the bag on each side are two grommets. An attachment hook goes through the grommets and connects to a fishing line. The bag material is thin sheets which easily transmit water.

6 Claims, 2 Drawing Sheets

THROW-AWAY CASTING BAG

This is a continuation-in-part of application Ser. No. 06/882,776 filed July 7, 1986, now abandoned.

BACKGROUND OF THE INVENTION

The type of invention is a fishing device which totally encloses the bait. There are many such devices listed under class 43, for example Pat. No. 3,688,430 which is a bag that holds bait. Some of the devices under class 43 are tubes that are similar to this device which are designed to hold the bait during casting, but which are designed to tip over to discharge the bait once the tube is in the water. There are other bags under class 43 which are made of mesh for the purpose of allowing the fish to see and taste the bait. None of the casting devices listed in class 43 has the novelty of disintegrating when put in water, and that novelty is described herein.

This casting bag holds a bait fish which is inserted through the top opening of the bag. The bait fish normally has a fish hook through it, and the fish hook is attached to a fishing line which extends outside the bag. With a little slack in the fishing line to the fish hook, an attachment hook attached to the fishing line is inserted through two grommets, one on each side of the bag near the top of the bag. Thus, when the bag is cast, the bag takes all the stress of the fishing line while holding the bait fish evenly distributed to stress in the bag, and taking the stress off the fish hook through the bait. When in the water, the glue holding the bag together dissolves, freeing the bait fish for use.

SUMMARY OF THE INVENTION

A throw-away casting bag is described that comes apart when it is in the water. The bag is generally long and narrow so as to just hold a bait fish. The top of the bag is open to allow easy insertion of the bait fish. The front, back, sides, and bottom of the bag are closed by seams which overlap. The seams are glued together with a glue that rapidly dissolves when it is in water. The sides, front, rear, and bottom of the bag are made of thin sheet material such as paper or plastic which readily transmits water. On each side of the bag near the top is a grommet. An attachment hook goes through the two grommets and attaches to a fishing line.

DETAILED DESCRIPTION

Figure 3:
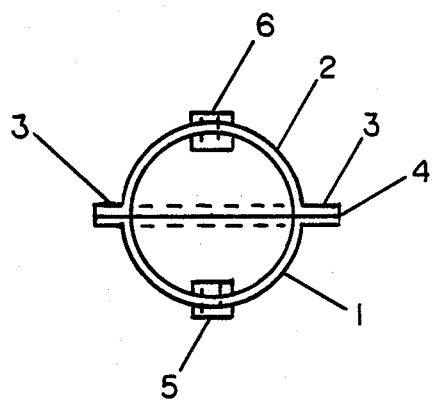
FIG. 3 is the top view of the casting bag.

Part 1 is the left hand part of the casting bag which is made of a thin sheet of material such as paper or plastic. Part 2 is the right hand part of the casting bag which is the same as part 1. Parts 1 and 2 are glued together at an overlapped portion part 3 shown for clarity on the outside of parts 1 and 2. Part 3 is designated a seam. Part 4 is glue that holds parts 1 and 2 together along seam part 3. Part 4 is a glue that rapidly dissolves when parts 1, 2, and 3 are immersed in water. Parts 1, 2, 3, and 4 are put together so that the bag is closed on the bottom, front, back, and sides, the top being open. Parts 1, 2, and 3 are made from material that quickly transmits water from one side to the other, for example by adsorbtion or by the inclusion of a multitude of small holes. Part 5 is a grommet located on the side of part 1 near the top end of the casting bag. Part 6 is a grommet in part 2 located on the side of part 2 near the top of the bag and is located adjacent to part 5. Part 7 is an attachment hook which is inserted in parts 5 and 6. The purpose of parts 5, 6, and 7 is to have a means of attachment on the bag for attachment to a fishing line via attachment hook part 7. When part 7 is inserted in parts 5 and 6, the top of the bag is held closed. The eye in attachment hook part 7 attaches to the fishing line, for example by a knot in the fishing line.

Figure 4:
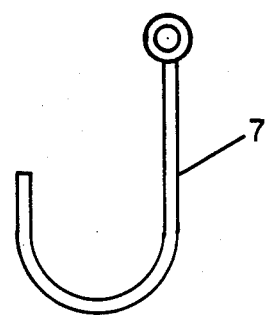
FIG. 4 is the attachment hook.
Figure 2:
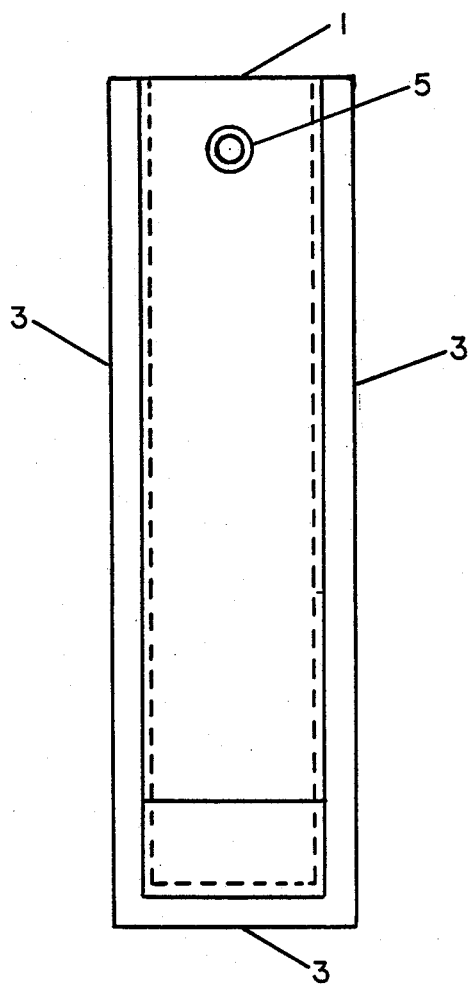
FIG. 2 is the side view of the casting bag.
Figure 1:
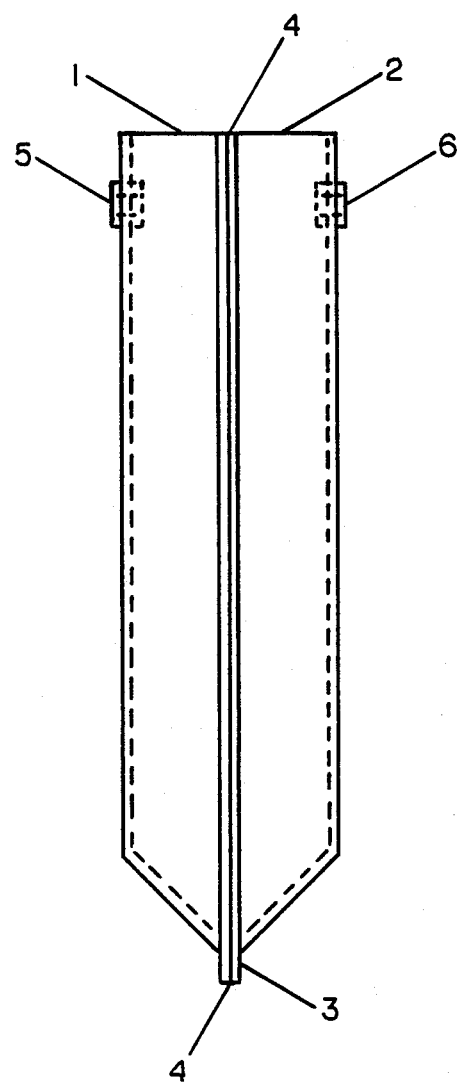
FIG. 1 is the front view of the casting bag.
Figure 5:
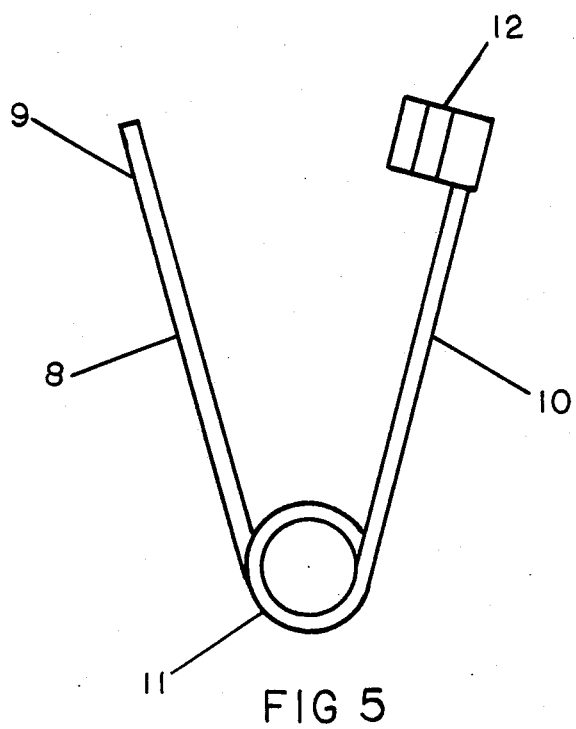
FIG. 5 is a hook with a spring and a safety catch.
Figure 6:
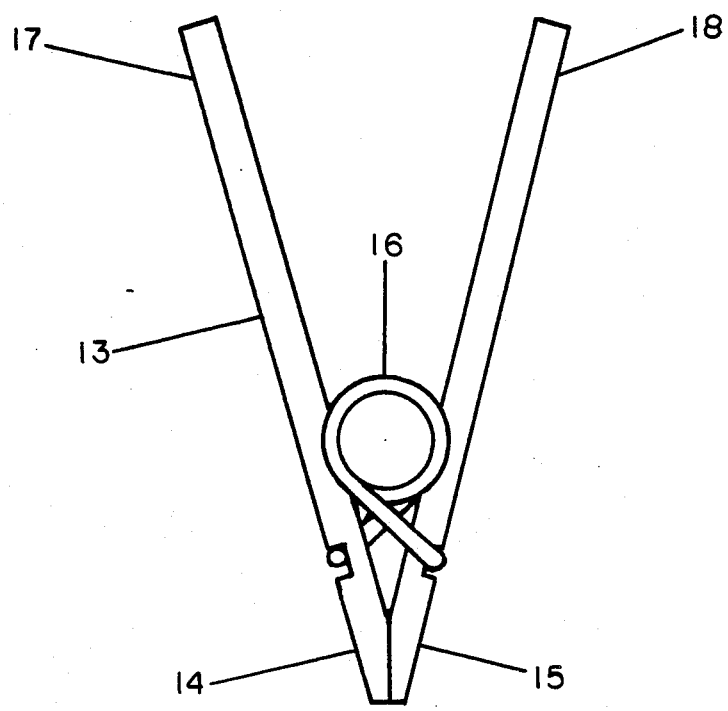
FIG. 6 is a clamp with a spring and handles.

FIGS. 1, 2, 3, and 4 show the principal example of the invention. However, there are a multitude of ways that the casting bag could be put together, such as by using one or several sheets of material. The seams could be made in a multitude of ways. The attachment device or means which is shown as two grommets and an attachment hook could be made of a multitude of attachment devices. Even the material of the bag could be made so that the binder rapidly dissolves, making the material come apart when in water. What is shown in FIGS. 1, 2, 3, and 4 is what appears to be the easiest way to make the invention which is a bag that holds a bait fish to a fishing line for casting and which comes apart rapidly when it is put in the water.

Part 8 is an alternative form of the hook. Part 9 is the hook of part 8. Part 10 is an extension handle of part 8. Part 11 is a spring of part 8, parts 9, 10, and 11 being made of spring material. Part 12 is a safety catch which holds part 9 after part 9 is inserted in the grommets parts 5 and 6.

Another example of the attachment devise or means is a spring clamp part 13 that attaches to the two sides parts 1 and 2 clamping them shut. The spring clamp part 13 is an easy device to quickly connect or disconnect a fishing line to the bag. Grommets parts 5 and 6 are not needed with part 13. The spring clamp part 13 is composed of two clamping pieces parts 14 and 15, a spring part 16 which forces the clamping parts 14 and 15 together and two handles part 17 and 18 connected to parts 14 and 15 respectively. The handles parts 17 and 18 are for the purpose of forcing the clamp pieces parts 14 and 15 apart by a person's hands to release the spring clamp part 13 from the bag. A fishing line connects to one or both handles in a hole through each handle or to the hole in the spring part 16.

What is claimed is:

1. A casting bag comprising:
   (a) said bag being made of at least one sheet of material which is made to allow water to penetrate from one side to the other,
   (b) said material being held together in at least one overlapped seam by a glue which loses its holding ability when immersed in water,
   (c) said bag being closed on the front, back, bottom, and sides, said bag being open at the top, and
   (d) an attachment means being two grommets located in said material on each side near the top of said bag and an attachment hook for insertion through said grommets, said hook also being attached to a fishing line.

2. The casting bag of claim 1 whereby said attachment hook is made of spring material and is in the form of a spring, an extension part of said hook having a safety clasp for holding said hook.

3. A casting bag comprising:

(a) said bag being made of at least one sheet of material which disintegrates when immersed in water,
(b) said material being held together in at least one overlapped seam by a glue which loses its holding ability when immersed in water,
(c) said bag being closed on the front, back, bottom, and sides, said bag being open at the top, and
(d) an attachment means being two grommets located in said material on each side near the top of said bag and an attachment hook for insertion through said grommets, said hook also being attached to a fishing line.

4. The casting bag of claim 3 whereby said attachment hook is made of spring material and is in the form of a spring, an extension part of said hook having a safety clasp for holding said hook.

5. A casting bag comprising:
(a) said bag being made of at least one sheet of material which is made to allow water to penetrate from one side to the other,
(b) said material being held together in at least one overlapped seam by a glue which loses its holding ability when immersed in water,
(c) said bag being closed on the front, back, bottom, and sides, said bag being open at the top, and
(d) an attachment means being attached to said material near the top of said bag and being also attached to a fishing line, said attachment means being a spring clamp with two clamping parts, a spring exerting pressure on said clamping parts, and two handles being each connected to a clamping part for releasing said spring clamp.

6. A casting bag comprising:
(a) said bag being made of at least one sheet of material which disintegrates when immersed in water,
(b) said material being held together in at least one overlapped seam by a glue which loses its holding ability when immersed in water,
(c) said bag being closed on the front, back, bottom, and sides, said bag being open at the top, and
(d) an attachment means being attached to said material near the top of said bag and being also attached to a fishing line, said attachment means being a spring clamp with two clamping parts, a spring exerting pressure on said clamping parts, and two handles being each connected to a clamping part for releasing said spring clamp.

* * * * *